United States Patent
Wakabayashi et al.

(10) Patent No.: US 8,912,741 B2
(45) Date of Patent: Dec. 16, 2014

(54) MOTOR DRIVER CONTROL METHOD, MOTOR DRIVER CONTROL DEVICE, MOTOR CONTROL DEVICE, AND IMAGE FORMING APPARATUS

(75) Inventors: Junko Wakabayashi, Tokyo (JP); Masashi Tokuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 843 days.

(21) Appl. No.: 12/796,094

(22) Filed: Jun. 8, 2010

(65) Prior Publication Data

US 2010/0308761 A1 Dec. 9, 2010

(30) Foreign Application Priority Data

Jun. 9, 2009 (JP) .................................. 2009-138520

(51) Int. Cl.
H02P 1/04 (2006.01)
H02P 27/08 (2006.01)
H02P 6/08 (2006.01)

(52) U.S. Cl.
CPC ................ H02P 27/08 (2013.01); H02P 6/085 (2013.01)
USPC ............ 318/400.17; 318/400.01; 318/400.11; 318/700

(58) Field of Classification Search
USPC .................... 318/400.01, 400.11, 400.17, 700
See application file for complete search history.

(56) References Cited

U.S. PATENT DOCUMENTS

| | | | | |
|---|---|---|---|---|
| 3,618,557 | A * | 11/1971 | Merriman ........................ | 116/86 |
| 5,861,824 | A | 1/1999 | Ryu et al. | |
| 7,129,667 | B2 * | 10/2006 | Murakami ............... | 318/400.01 |
| 7,580,160 | B2 | 8/2009 | Tokuda | |
| 2004/0000884 | A1 * | 1/2004 | Inao et al. ..................... | 318/254 |
| 2004/0263104 | A1 * | 12/2004 | Iwanaga et al. ............... | 318/439 |
| 2005/0146311 | A1 * | 7/2005 | Kuo et al. ...................... | 323/282 |
| 2007/0024228 | A1 * | 2/2007 | Fujinaka ....................... | 318/696 |
| 2007/0036206 | A1 | 2/2007 | Tokuda et al. | |
| 2008/0272724 | A1 * | 11/2008 | Hayashi ........................ | 318/430 |
| 2009/0045762 | A1 * | 2/2009 | Hayashi et al. ............... | 318/379 |
| 2009/0049463 | A1 * | 2/2009 | Ueda ............................. | 720/695 |

(Continued)

FOREIGN PATENT DOCUMENTS

| | | |
|---|---|---|
| JP | 9-84388 | 3/1997 |
| JP | 2007-295649 | 11/2007 |

(Continued)

OTHER PUBLICATIONS

U.S. Appl. No. 08/75874, filed Jun. 14, 1993.
Japanese official action dated Jul. 30, 2013 in corresponding Japanese patent application No. 2009-138520.

*Primary Examiner* — Kawing Chan
(74) *Attorney, Agent, or Firm* — Cooper & Dunham LLP

(57) ABSTRACT

A disclosed motor driver control device is configured to control a plurality of switching devices that drive a motor. The motor driver control device includes a duty control unit configured to restrict a duty of a first pulse width modulation signal generated by comparing an oscillator signal generated at a predetermined cycle and a pulse generator signal so as to generate a second pulse width modulation signal, and a switching device control signal generator unit configured to include a logic circuit that operates the second pulse width modulation signal as a clock and configured to generate a switching device control signal controlling the plurality of switching devices based on the clock of the logic circuit of the switching device control signal generator unit.

10 Claims, 9 Drawing Sheets

(56) References Cited

U.S. PATENT DOCUMENTS

2009/0153084 A1* 6/2009 Mishima et al. ......... 318/400.13
2009/0243534 A1* 10/2009 Imai .............................. 318/808
2009/0261764 A1* 10/2009 Hirata ...................... 318/400.29

FOREIGN PATENT DOCUMENTS

| | | |
|---|---|---|
| JP | 2008-43166 | 2/2008 |
| JP | 2008-109835 | 5/2008 |
| JP | 2009-9103 | 1/2009 |

\* cited by examiner

MOTOR DRIVER CONTROL METHOD, MOTOR DRIVER CONTROL DEVICE, MOTOR CONTROL DEVICE, AND IMAGE FORMING APPARATUS

CROSS-REFERENCE TO RELATED APPLICATION

The present application is based on, and claims the priority of, Japanese priority application No. 2009-138520 filed on Jun. 9, 2009 with the Japanese Patent Office.

BACKGROUND OF THE INVENTION

1. Field of the Invention

The invention generally relates to a motor driver control method and a motor driver control device for controlling a motor driver that drives a motor, a motor control device having the motor driver control device, and an image forming apparatus having the motor control device.

2. Description of the Related Art

Motor driver control devices are widely utilized in apparatuses such as copiers and laser printers. The motor driver control device typically converts a direct-current (DC) voltage that is supplied from a direct-current (DC) power supply into three-phase (U, V, and W) electric driving power, using a PWM (pulse-width modulation) inverter. First, examples of a related art motor driver control device such as those disclosed in Japanese Patent Application Publication No. 2008-43166 or Japanese Patent Application Publication No. 2008-109835 are described below, with reference to FIGS. 8 and 9.

FIG. 8 is a schematic diagram illustrating a configuration example of the related art motor driver control device. As illustrated in FIG. 8, the related art motor driver control device 100 includes a triangular wave oscillator circuit 101, a PWM pulse generator circuit 102, a reciprocal switching signal generator circuit 103, and a switching device control signal generator circuit 104. The motor driver control device 100 is connected to a brushless motor 300 via a PWM inverter 200. Note that the motor driver control device 100 illustrated in FIG. 8 is an example of the motor driver control device that does not require an external clock.

The PWM inverter 200 includes a first arm having a first pair of switching devices 201 and 204 connected in series, a second arm having a second pair of switching devices 202 and 205 connected in series, and a third arm having a third pair of switching devices 203 and 206 connected in series, with the first, the second and the third arms being connected in parallel. Note that the first, the second and the third arms correspond to U, V and W phases constituting the brushless motor 300.

The motor driver control device 100 supplies electric driving power to the U, V and W phases constituting the brushless motor 300 by alternately switching between the higher side switching devices 201, 202 and 203 and the lower side switching devices of the corresponding first to third arms ON and OFF at a predetermined timing. The motor driver control device 100 controls a rotational speed of the brushless motor 300 by adjusting ON and OFF duration of the switching devices.

In the motor driver control device 100, in order to prevent short circuit (arm short circuit) from occurring between the higher side switching devices 201, 202 and 203 and the lower side switching devices 204, 205 and 206, a predetermined dead time is provided at an ON-OFF switching time. The "dead time" indicates duration where the respective pairs of switching devices 201 and 204, 202 and 205, and 203 and 206 are both switched off.

Moreover, in the motor driver control device 100, a rotational speed of the brushless motor 300 or an amount of electric current passing through the brushless motor 300 is detected, and the detected result is compared with a target set value so as to determine the duty of a PWM signal (pulse width modulation signal), which is called a "feed back control". The feedback control may be computed digitally by a microprocessor unit or carried out by an analog circuit. When the analog circuit carries out the feedback control, a duty instruction signal is also generated based on an analog voltage.

In the motor driver control device 100, the triangular wave oscillator circuit 101 is configured to generate a triangular wave TRO. The PWM pulse generator circuit 102 is configured to compare a duty instruction signal AIN input from an input terminal 105 with the triangular wave TRO generated by the triangular wave oscillator circuit 101, thereby generating a PWM pulse. The reciprocal switching signal generator circuit 103 is configured to select a phase where a vertical PWM operation is carried out based on positional information of a rotor of the brushless motor 300 to generate a reciprocal switching signal HP (Hall Phase). The switching device control signal generator circuit 104 is configured to generate control signals UH, UL, VH, VL, WH, and WL to switch the switching devices 201 through 206 ON and OFF based on the PWM pulse and the reciprocal switching signal HP.

FIG. 9 is a diagram illustrating operations of the motor driver control device according to the related art in FIG. 8. The operations of the motor driver control device 100 according to the related art are described with reference FIG. 9. Specifically, the operations of the motor driver control device 100, when the U-phase of the brushless motor 300 performs the vertical PWM operation, is described.

As illustrated in FIG. 9, the PWM pulse generator circuit 102 compares the duty instruction signal AIN with the triangular wave TRO. The PWM pulse generator circuit 102 then generates a high (H) level PWM pulse when the duty instruction signal AIN is greater than the triangular wave TRO, while the PWM pulse generator circuit 102 generates a low (L) level PWM pulse when the duty instruction signal AIN is smaller than the triangular wave TRO. The switching device control signal generator circuit 104 generates control signals UH, UL, VH, VL, WH, and WL. However, when the U-phase of the brushless motor 300 carries out the vertical PWM operation, the control signal UH controlling the higher side U-phase switching device 201 functions as the same signal as the PWM pulse, and the control signal UL controlling the lower side U-phase switching device 204 functions as an inversion signal of the PWM pulse. Further, for allowing the electric current flown from the U-phase to a coil to pass through another phase, the control signals VH, VL, WH, and WL are output so as to turn on one of the lower side V-phase switching device 205 and the lower side W-phase switching device 206 and turn off the other thereof based on the reciprocal switching signal HP.

Thus, the switching device control signal generator circuit 104 generates the control signals UN, UL, VH, VL, WH, and WL based on the PWM pulse generated based on the duty instruction signal AIN and the reciprocal switching signal HP so as to turn ON and OFF the higher side switching devices and the lower side switching devices of each phase. The switching device control signal generator circuit 104 controls the switching devices 201 thorough 206 to sequentially apply the of voltage to the coils of the plural phases of the brushless motor 300, thereby controlling the rotation of the brushless motor 300. Note that a restraint protection instruction or the like that deactivates the motor completely may be required according to the usage of the motor when the rotational direction instruction, the brake application instruction, or the motor is deactivated for a certain period of time.

Since turning ON and OFF of the switching devices may require a dead time, the motor may be provided with a monostable multivibrator circuit that is triggered off by the edge of the PWM pulse. When the rotational direction instruction and the brake application instruction are input, the control signals for corresponding switching devices are changed. However, it is difficult to acquire the dead time while changing the control signals for each switching device in the middle of the PWM pulse generation, which may result in generating through current. Therefore, to secure the deadtime, the instruction signal is made synchronous once based on the PWM signal, and the switching devices are switched corresponding to the control signals in synchronization with the edge of the following PWM pulse. Further, a restraint protection instruction function determines whether the number of pulses incremented by a counter reaches a predetermined count value; however, in this case, a separate clock may not be required if the number of the PWM pulses is counted instead by the counter.

Accordingly, a logic circuit constituting the switching device control signal generator circuit 104 operates in synchronization with the edge of the PWM pulse. That is, the logic circuit operates the PWM pulse as a clock pulse.

However, in the related art motor driver control device 100, the duty of the PWM pulse results in 100% when the duty instruction signal AIN is continuously greater than the triangular wave TRO, whereas the duty of the PWM pulse results in 0% when the duty instruction signal AIN is continuously smaller than the triangular wave TRO. In this state, the edge of the PWM pulse formed of the clock is not supplied to the logic circuit constituting the switching device control signal generator circuit 104, and hence, the generation of control signals by corresponding switching devices, the control of the brake, the change of the rotational direction, and the restraint protection operation of the motor, and the like may not be carried out.

SUMMARY OF THE INVENTION

Accordingly, it is a general object of at least one embodiment of the present invention to provide a motor driver control method and a motor driver control device capable of supplying stable clocks to a logic circuit, a motor control device having the motor driver control device, and an image forming apparatus having the motor control device solving one or more problems caused by the limitations and disadvantages of the related art.

According to one embodiment, there is provided a motor driver control device controlling a plurality of switching devices that drive a motor. The motor driver control device includes: a duty control unit configured to restrict a duty of a first pulse width modulation signal generated by comparing an oscillator signal generated at a predetermined cycle and a pulse generator signal so as to generate a second pulse width modulation signal; and a switching device control signal generator unit configured to include a logic circuit that operates the second pulse width modulation signal as a clock and configured to generate a switching device control signal controlling the plurality of switching devices based on the clock of the logic circuit of the switching device control signal generator unit.

According to another embodiment, there is provided a motor driver control method for controlling a plurality of switching devices that drive a motor. The motor driver control method includes: restricting a duty of a first pulse width modulation signal generated by comparing an oscillator signal generated at a predetermined cycle and a pulse generator signal so as to generate a second pulse width modulation signal; and generating a switching device control signal controlling the plurality of switching devices based on the second pulse width modulation signal operated as a clock.

According to another embodiment, there is provided a motor control device that includes a plurality of switching devices configured to drive a motor; and the above mentioned motor driver control device.

According to another embodiment, there is provided an image forming apparatus that includes a motor; and one of the above mentioned motor control devices.

Other objects and further features of embodiments will be apparent from the following detailed description when read in conjunction with the accompanying drawings.

DESCRIPTION OF THE PREFERRED EMBODIMENTS

In the following, embodiments of the present invention will be described by referring to the accompanying drawings.

First Embodiment

Motor Driver Control Device Configuration According to First Embodiment

Figure 1:
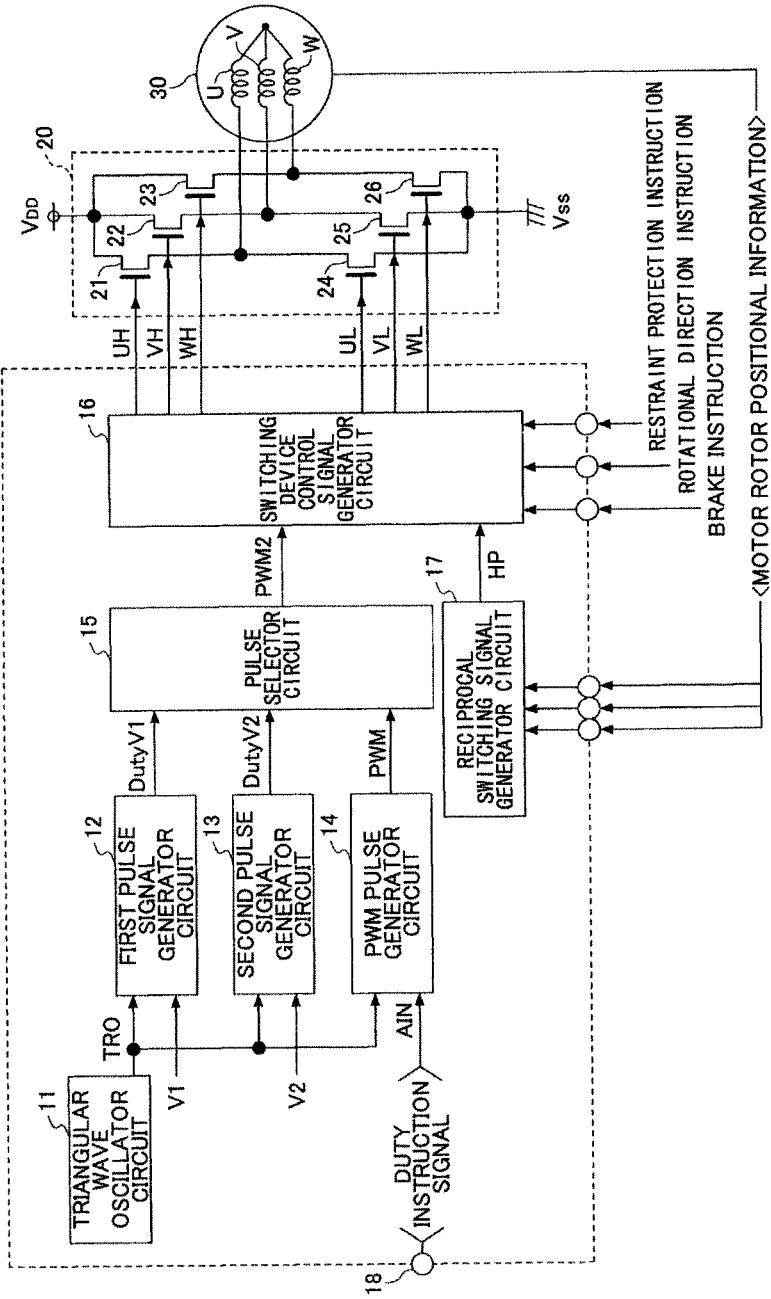
FIG. 1 is a schematic diagram illustrating a configuration example of a motor driver control device according to a first embodiment.

First, a schematic configuration of a motor driver control device according to a first embodiment is described. FIG. 1 is a diagram illustrating a configuration example of the motor driver control device according to the first embodiment. As illustrated in FIG. 1, the motor driver control device 10 according to the first embodiment includes a triangular wave oscillator circuit 11, a first pulse signal generator circuit 12, a second pulse signal generator circuit 13, a PWM pulse generator circuit 14, a pulse selector circuit 15, a switching device control signal generator circuit 16, and a reciprocal switching signal generator circuit 17. However, the triangular wave oscillator circuit 11, the PWM pulse generator circuit 14, and the reciprocal switching signal generator circuit 17 may be provided outside of the motor driver control device 10. That is, the motor driver control device 10 basically includes the pulse selector circuit 15, the first pulse signal generator circuit 12, the second pulse signal generator circuit 13, and the switching device control signal generator circuit 16.

The motor driver control device 10 is connected to a brushless motor 30 via a PWM inverter 20. Note that the motor driver control device 10 illustrated in FIG. 1 is an example of the motor driver control device that does not require an external clock.

The PWM inverter 20 includes plural switching devices to drive the brushless motor 30. The PWM inverter 20 includes a first arm having a first pair of switching devices 21 and 24 connected in series, a second arm having a second pair of switching devices 22 and 25 connected in series, and a third arm having a third pair of switching devices 23 and 26 connected in series, with the first, the second, and the third arms being connected in parallel. The first, the second, and the third arms correspond to U, V, and W phases constituting the brushless motor 30. The switching devices 21 to 26 may be a field-effect transistor (FET), an insulated gate bipolar transistor (IGBT device), and the like.

The motor driver control device 10 is configured to control the PWM inverter so as to alternately turn ON and OFF the first to the third arm higher side switching devices of 21, 22, and 23 and the first to the third arm lower side switching devices of 24, 25, and 26 at predetermined timing. The PWM inverter 20 supplies the electric driving power to the U, V, and W phases constituting the brushless motor 30 in this manner. The rotational speed of the brushless motor 30 is controlled by the motor driver control device 10 that adjusts duration of ON and OFF of the switching devices 21 to 26 constituting the PWM inverter 20.

In the motor driver control device 10, in order to prevent short circuit (arm short circuit) from occurring between the higher side switching devices 21, 22, and 23 and the lower side switching devices 24, 25, and 26, a predetermined dead time is provided at ON-OFF switching time. The "dead time" is a duration where the respective pairs of switching devices 21 and 24, 22 and 25, and 23 and 26 are both switched off.

Moreover, in the motor driver control device 10, a rotational speed of or an amount of electric current passing through the brushless motor 30 is detected, and the detected result of the rotational speed of or the amount of electric current passing through the brushless motor 30 is compared with the target set value so as to determine the duty of a PWM signal (pulse width modulation signal). This process is called a feed back control. The feedback control may be computed digitally by a microprocessor unit or carried out by an analog circuit. When the analog circuit carries out the feedback control, a duty instruction signal is also generated based on an analog voltage.

Note that the "duty" is defined as the ratio of high (H) level duration of a PWM signal (pulse width modulation signal) to a cycle T of the PWM signal. That is, "Duty=High (H) level Duration/Cycle T=High (H) level Duration/(High (H) level Duration+Low (L) level Duration)". For example, if the PWM signal is generated at a high (H) level all through the cycle, the duty is 100%. In contrast, if the PWM signal is generated at a low (L) level all through the cycle, the duty is 0%. Further, if a high (H) level duration of the PWM signal=a low (L) level duration of the PWM signal, the duty is 50%.

In the motor driver control device 10, the triangular wave oscillator circuit 11 is configured to generate a triangular wave TRO. The triangular wave TRO is an oscillating signal having a frequency range of 5 KHz to 100 KHz. The first pulse signal generator circuit 12 is configured to compare the triangular wave TRO with a first DC voltage V1 to generate a pulse DutyV1 having a first duty. The first pulse signal generator circuit 12 is a typical example of the first pulse signal generator unit in the first embodiment of the present invention. The pulse DutyV1 is a typical example of the first pulse signal having the first duty in the first embodiment of the present invention.

The second pulse signal generator circuit 13 is configured to compare the triangular wave TRO with a second DC voltage V2 to generate a pulse DutyV2 having a second duty. The second pulse signal generator circuit 13 is a typical example of the second pulse signal generator unit in the first embodiment of the present invention. The pulse DutyV2 is a typical example of the second pulse signal having the second duty in the first embodiment of the present invention. Note that the second duty is smaller than the first duty. Note also that the second DC voltage V2 is smaller than the first DC voltage V1.

The PWM pulse generator circuit 14 is configured to compare the duty instruction signal AIN input from an input terminal 18 with the triangular wave TRO generated by the triangular wave oscillator circuit 11 to generate a PWM pulse, that is, the first pulse width modulation signal. The duty instruction signal AIN is a typical example of the signal for generating a pulse (hereinafter also called a "pulse generator signal") in the first embodiment of the present invention. Note that the duty instruction signal AIN may be generated by a CPU (not shown).

The pulse selector circuit 15 is configured to select one of the pulse DutyV1, the pulse DutyV2 and the PWM pulse to generate a PWM2 pulse. Specifically, the pulse selector circuit 15 includes a selector unit configured to selectively output a signal having a duty between the first duty and the second duty from PWM pulses of first pulse width modulation signals based on the pulse DutyV1 of the first pulse signal and the pulse DutyV2 of the second pulse signal. In this process, the selectively output signal is the PWM2 pulse, that is, a second pulse width modulation signal. The first pulse signal generator circuit 12, the second pulse signal generator circuit 13, and the pulse selector circuit 15 constitute a typical example of a duty restriction unit in the first embodiment of the present invention.

The switching device control signal generator circuit 16 includes a logic circuit such as flip-flop, and is configured to generate the control signals UH, UL, VH, VL, WH and WL based on the PWM2 pulse and the reciprocal switching signal HP so as to turn ON and OFF the switching devices 21 to 26. The switching device control signal generator circuit 16 is also configured to provide dead time for preventing the higher side switching devices and the lower side switching device for each phase from being simultaneously turned on. The switching device control signal generator circuit 16 is further configured to execute brake instructions, rotational direction instructions, and restraint protection instructions of the brushless motor 30. Note that the logic circuit constituting the switching device control signal generator circuit 16 is configured to operate based on the PWM2 pulse as a clock. The reciprocal switching signal generator circuit 17 is configured to select a phase where a vertical PWM operation is carried out based on positional information of a rotor of the brushless motor 30 so as to generate a reciprocal switching signal HP (Hall Phase).

Figure 2:
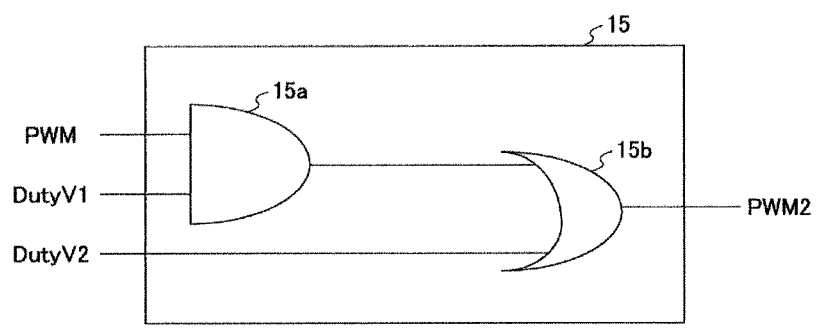
FIG. 2 is a diagram illustrating an example of a pulse selector circuit in FIG. 1.

FIG. 2 is a diagram illustrating an example of the pulse selector circuit in FIG. 1. As illustrated in FIG. 2, the pulse selector circuit 15 includes an AND gate 15a and an OR gate 15b. The AND gate 15a is supplied with the pulse DutyV1 generated from the first pulse signal generator circuit 12 and the PWM pulse generated from the PWM pulse generator circuit 14. The AND gate 15a outputs a high (H) level pulse if the pulse DutyV1 and the PWM pulse are both at a high (H) level.

The OR gate 15b is supplied with the pulse DutyV2 generated from the second pulse signal generator circuit 13 and an AND gate output pulse generated from the AND gate 15a. The OR gate 15b outputs a high (H) level pulse if one of the pulse DutyV2 and the AND gate output pulse generated from the AND gate 15a is at a high (H) level. The OR gate 15b outputs the PWM2 pulse.

As described above, the pulse selector circuit 15 selects one of the pulse DutyV1, the pulse DutyV2 and the PWM pulse to output the selected pulse as the PWM2 pulse. This circuit configuration is not particularly limited to the circuit configuration illustrated in FIG. 2, insofar as the circuit configuration is logically equivalent as a whole. The PWM2 pulse has the duty between the first duty (of pulse DutyV1) and the second duty (of pulse DutyV2). So far, the description is given of the schematic configuration of the motor driver control device according to the first embodiment.

Motor Driver Control Device Operation According to First Embodiment

Figure 3:
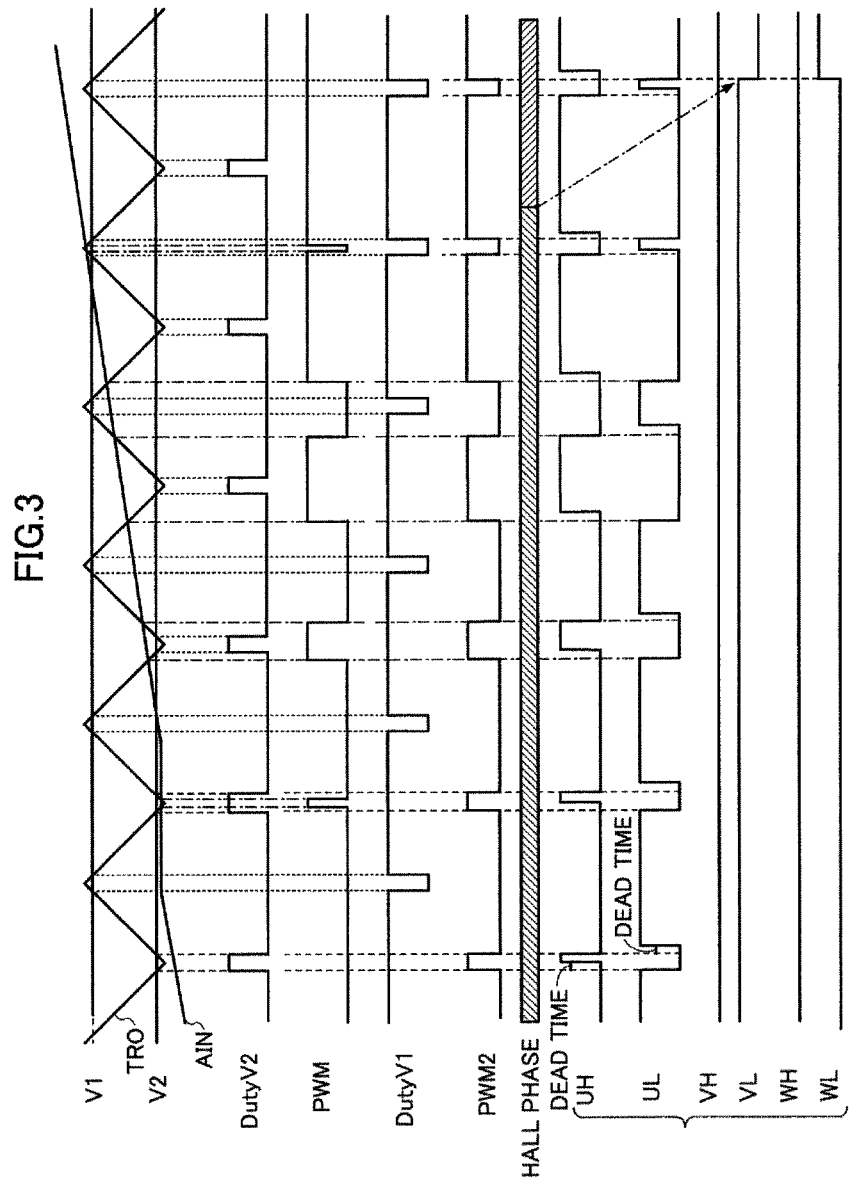
FIG. 3 is a diagram illustrating operations of the motor driver control device according to the first embodiment.

Next, a schematic operation of the motor driver control device according to the first embodiment is described. FIG. 3 is a diagram illustrating operations of the motor drive control device according to the first embodiment. The operations of the motor driver control device 10 according to the first embodiment are described with reference to FIG. 3. Specifically, the operations of the motor driver control device 10, when the U-phase of the brushless motor 30 performs the vertical PWM operation, is described.

As illustrated in FIG. 3, the PWM pulse generator circuit 14 compares the duty instruction signal AIN with the triangular wave TRO. The PWM pulse generator circuit 14 then generates a high (H) level PWM pulse when the duty instruction signal AIN is greater than the triangular wave TRO, while the PWM pulse generator circuit 14 generates a low (L) level PWM pulse when the duty instruction signal AIN is smaller than the triangular wave TRO. The first pulse signal generator circuit 12 compares the triangular wave TRO with the first DC voltage V1. The first pulse signal generator circuit 12 then generates a high (H) level pulse DutyV1 when the first DC voltage V1 is greater than the triangular wave TRO, while the first pulse signal generator circuit 12 generates a low (L) level pulse DutyV1 when the first DC voltage V1 is smaller than the triangular wave TRO.

The second pulse signal generator circuit 13 compares the triangular wave TRO with the second DC voltage V2. The second pulse signal generator circuit 13 then generates a high (H) level pulse DutyV2 when the second DC voltage V2 is greater than the triangular wave TRO, while the second pulse signal generator circuit 13 generates a low (L) level pulse DutyV2 when the second DC voltage V2 is smaller than the triangular wave TRO.

Note that since the maximum duty can be determined based on the pulse DutyV1, an amount of duty can be optionally set by adjusting the first DC voltage V1. Note also that since the minimum duty can be determined based on the pulse DutyV2, an amount of duty can be optionally set by adjusting the second DC voltage V2. When optionally setting the duty, it is preferable that duration of generating a low (L) level pulse DutyV1 and duration of a high (H) level pulse DutyV2 be set at 10 ns or more. If the duration of generating the low (L) level pulse DutyV1 or the duration of a high (H) level pulse DutyV2 is set at shorter than 10 ns, the switching device control signal generator circuit 16 may malfunction.

That is, the low (L) level duration of the pulse DutyV1 and the high (H) level duration of the pulse DutyV2 are controlled to be longer than 10 ns by adjusting the first DC voltage V1 and the second DC voltage V2, and the PWM pulse may include a signal generated shorter than 10 ns due to the adjustment of the first and second DC voltages V1 and V2. However, since the PWM2 pulse is generated for an equal to or longer than 10 ns, the logic circuit of the switching device control signal generation circuit 16 can be prevented from malfunctioning.

The pulse selector circuit 15 selects the pulse DutyV1 when the duty of the PWM pulse supplied from the PWM pulse generator circuit 14 is greater than the duty of the pulse DutyV1, while the pulse selector circuit 15 selects the pulse DutyV2 when the duty of the PWM pulse supplied from the PWM pulse generator circuit 14 is smaller than the duty of the pulse DutyV2. In neither of the above cases, the pulse selector circuit 15 selects the PWM pulse supplied from the PWM pulse generator circuit 14 and outputs it as the PWM2 pulse.

The control signal UH that turns ON and OFF of the higher side U-phase switching device 21 is generated as a signal that remains at a high (H) level from a rise time of the PWM2 pulse as a starting point, where the dead time is provided, to a fall time of the PWM2 pulse. The control signal UL of the lower side U-phase switching device 24 is generated as a signal that remains at a high (H) level from a fall time of the PWM2 pulse as a starting point, where the dead time is provided, to a rise time of the PWM2 pulse. In this manner, the dead time is obtained at an edge of the PWM2 pulse as a starting point, thereby preventing through current from generating.

Further, for allowing the electric current flown from the U-phase to a coil to pass through another phase, one of the lower side V-phase switching device 25 and the lower side W-phase switching device 26 is turned on based on the reciprocal switching signal HP so as to output the control signals VH, VL, WH, and WL to turn off the other switching device. So far, the description is given of the schematic operation of the motor driver control device according to the first embodiment.

The motor driver control device according to the first embodiment generates the PWM2 pulse having the duty restricted based on the pulse DutyV1 and the pulse DutyV2, whereby the duty of the PWM2 pulse will not result in 0% or 100%. As a result, the switching device control signal generator circuit 16 can stably generate the control signal synchronized with the PWM2 pulse, which enables a stable operation of the logic circuit and a switching control regardless of the amount of the duty of the PWM pulse.

Moreover, since the PWM2 pulse, the duty of which is restricted based on the pulse DutyV1 and the pulse DutyV2, is employed as a clock, the motor driver control device may not need to have an external clock, an oscillator circuit, and a frequency divider circuit. Accordingly, the motor driver control device has a p saving circuit configuration.

Further, since the PWM2 pulse, the duty of which is restricted based on the pulse DutyV1 and the pulse DutyV2, is employed as a clock of the logic circuit, the logic circuit is capable of operating in synchronization with the edge of the PWM2 pulse. Accordingly, even if the control signal is changed based on the rotational direction instruction or the brake instruction of the motor, the dead time is obtained based on the edge of the PWM2 pulse. If the PWM2 pulse is employed for the implementation of the restraint protection instruction function, a clock may not need to be provided in addition to the PWM2 pulse.

Second Embodiment

Figure 4:
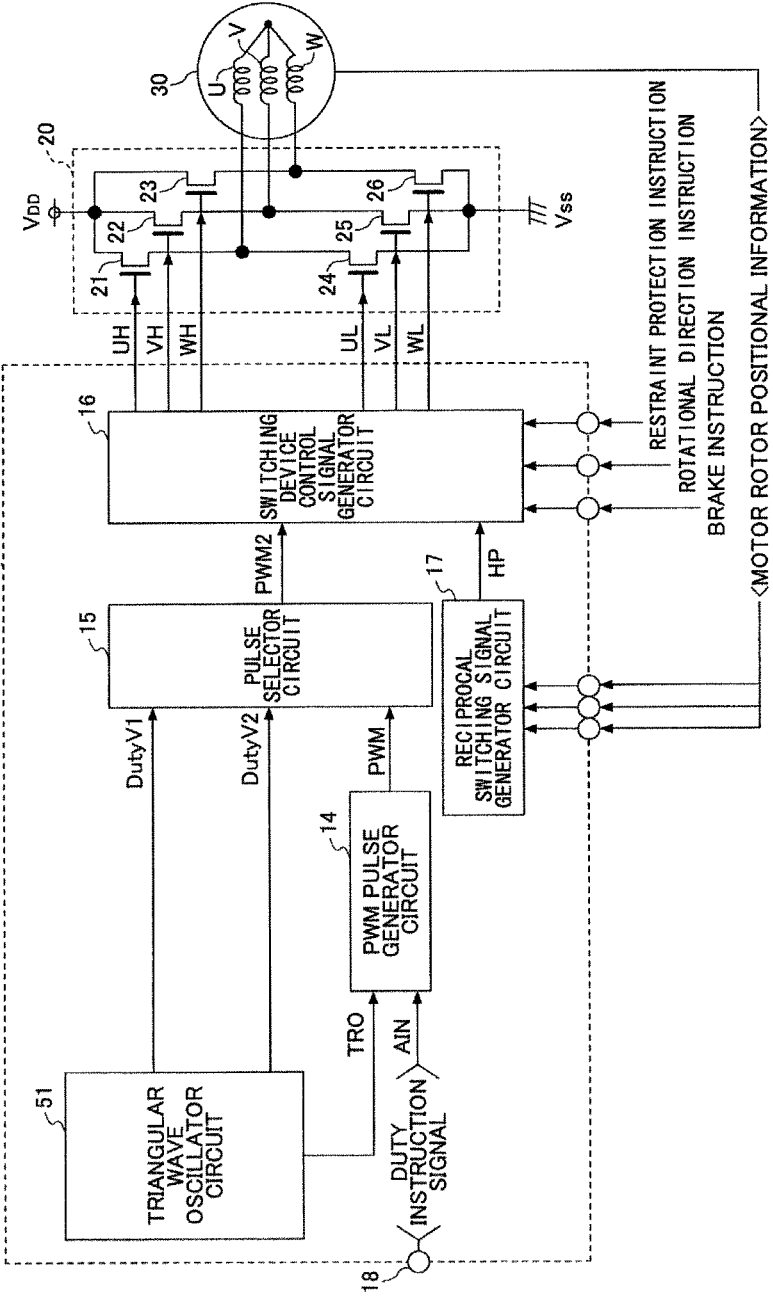
FIG. 4 is a schematic diagram illustrating a configuration example of a motor driver control device according to a second embodiment.

A second embodiment describes an example of a motor driver control device that differs from the first embodiment. FIG. 4 is a diagram illustrating a configuration example of the motor driver control device according to the second embodiment. In FIG. 4, the same reference numerals are assigned to components identical to those of FIG. 1, and the descriptions thereof may be omitted.

As illustrated in FIG. 4, a motor driver control device 50 according to the second embodiment is different from the motor driver control device 10 according to the first embodiment in that the motor driver control device 50 includes a triangular wave oscillator circuit 51 in place of the triangular wave oscillator circuit 11, and includes neither the first pulse signal generator circuit 12 nor the second pulse signal generator circuit 13. Other components of the motor driver control device 50 are the same as those of the motor driver control device 10. The following description of the second embodiment is focused on parts of the configuration that differ from the first embodiment, and the description of those common to the first embodiment are omitted.

Figure 5:
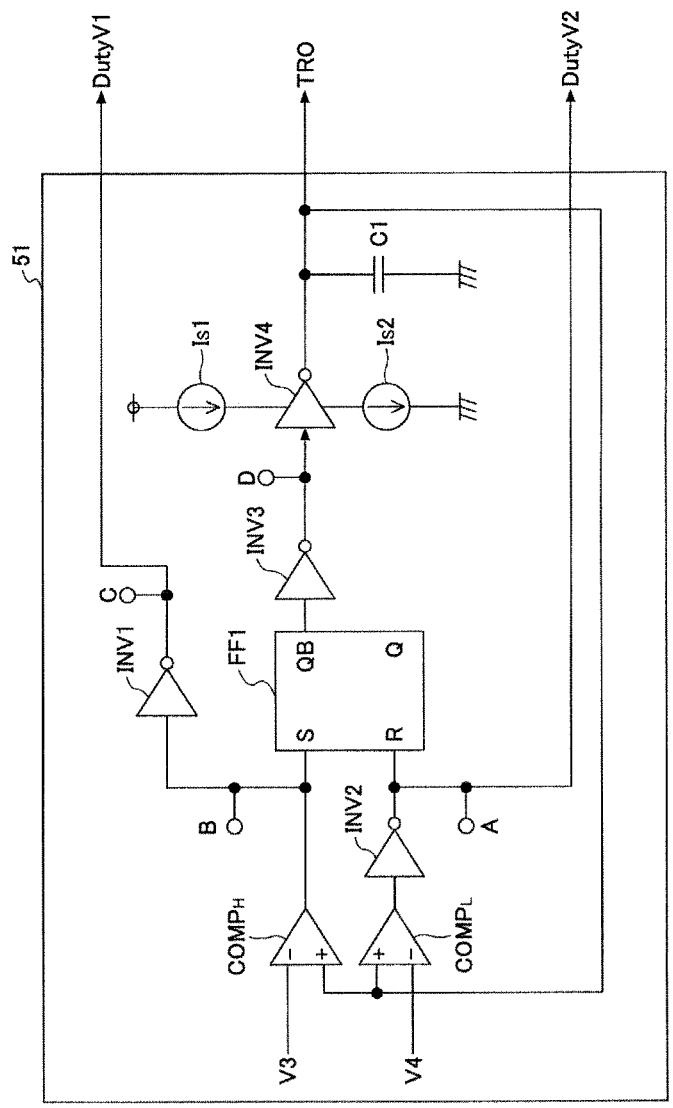
FIG. 5 is a diagram illustrating an example of a triangular wave oscillator circuit in FIG. 4.

FIG. 5 is a diagram illustrating an example of the triangular wave oscillator circuit in FIG. 4. As illustrated in FIG. 5, the triangular wave oscillator circuit 51 includes a current source Is1, a current source Is2, a capacitor C1, a flip-flop FF1, a comparator COMPH, a comparator COMPL, an inverter INV1, an inverter INV2, an inverter INV3, and an inverter INV4. V3 and V4 (V3>V4) represent predetermined constant DC voltages.

In the triangular wave oscillator circuit 51, when an output of the inverter INV4 is at a high (H) level, a current is flown from a charging unit of the current source Is1 to a storage unit of a capacitor C1, thereby charging the capacitor C1. In contrast, when an output of the inverter INV4 is at a low (L) level, a current is flown from the capacitor C1 to a discharging unit of the current source Is2, thereby discharging the capacitor C1.

The charging and discharging of the capacitor C1 are switched by the flip-flop FF1, the comparator COMPH, the comparator COMPL, and the inverters INV2 and INV3. The flip-flop FF1, the comparator COMPH, the comparator COMPL, and the inverters INV2 and INV3 constitute a typical example of a switching timing generator unit in the second embodiment. Further, description is given of operations of the triangular wave oscillator circuit below by referring to the FIG. 6.

Figure 6:
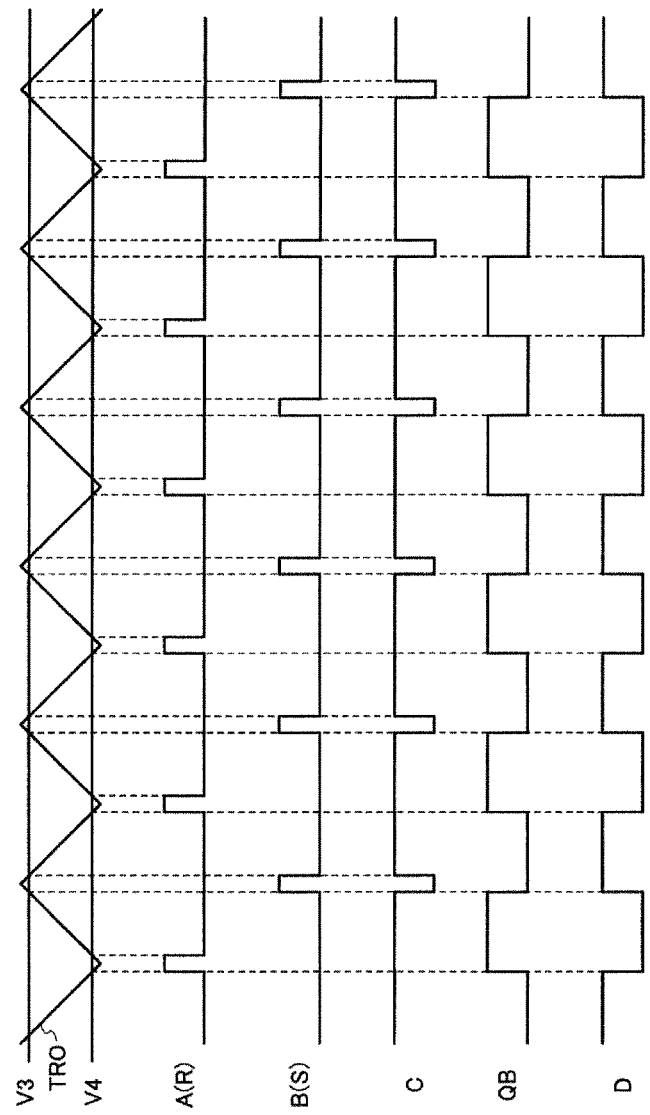
FIG. 6 is a diagram illustrating operations of the triangular wave oscillator circuit.

FIG. 6 is a diagram illustrating operations of the triangular wave oscillator circuit in FIG. 5. In the following, it is assumed that an output D of the inverter INV3 is at a high (H) level (D=H) in the triangular wave oscillator circuit 51. In this condition, an output of the inverter INV4 is L and the capacitor C1 is discharging current. As a result, the triangular wave TRO forms a downward slope from top left to bottom right.

If the triangular wave TRO< a DC voltage V4, an output of the comparator COMPL is switched from a high (H) level to a low (L) level, thereby switching an output A of the inverter INV2 from a low (L) level to a high (H) level (from A=L to A=H). Note that an output B of the comparator OOMPH remains at a low (L) level (B=L). As a result, an output QB of the flip-flop FF1 is switched from a low (L) level to a high (H) level (from QB=L to QB=H), and the output D of the inverter INV3 is switched from a high (H) level to a low (L) level (from D=H to D=L). Thereafter, an output of the inverter INV4 is switched to a high (H) level, so that the current is flown from the charging unit of the current source Is1 to the storage unit of the capacitor C1, thereby charging the capacitor C1. Accordingly, the triangular wave TRO forms an upward slope from bottom left to top right. Note that if the triangular wave TRO<the DC voltage V4 due to charging of the capacitor C1, the output of the comparator COMPL is switched from a low (L) level to a high (H) level, thereby switching the output A of the inverter INV2 from a high (H) level to a low (L) level (from A=H to A=L). Note also that an output B of the comparator COMPH remains at the low (L) level (B=L).

If the triangular wave TRO>a DC voltage V3, an output B of the comparator COMPH is switched from a low (L) level to a high (H) level (from B=L to B=H). Note that an output of the comparator COMPL remains at a high (H) level, and the output A of the inverter INV2 remains at a low (L) level. As a result, the output QB of the flip-flop FF1 is switched from a high (H) level to a low (L) level (from QB=H to QB=L), and the output D of the inverter INV3 is switched from a low (L) level to a high (H) level (from D=L to D=H). Thereafter, the output of the inverter INV4 is switched to a low (L) level, so that the current is flown from the capacitor C1 to the discharging unit of the current source Is2, thereby discharging the capacitor C1. Accordingly, the triangular wave TRO forms a downward slope from top left to bottom right. Further, if the triangular wave TRO<the DC voltage V3, the output B of the comparator COMPH is switched from a high (H) level to a low (L) level (from B=H to B=H). Note that the output H of the comparator COMPL remains at a high (H) level, and the output A of the inverter INV2 remains at a low (L) level. The triangular waves TRO illustrated in FIG. 6 are obtained by repeating the above described operations.

Meanwhile, the output B of the comparator OOMPH is supplied to the inverter INV1, and an output C of the inverter INV1 (i.e., output C having a waveform obtained by inverting the high (H) level and the low (L) level of the output B) is output outside of the triangular wave oscillator circuit 51. Note that relationships between the triangular wave TRO and the waveform C, and between the triangular wave TRO and the waveform A illustrated in FIG. 6 respectively correspond to those between the triangular wave TRO and the pulse DutyV1, and between the triangular wave TRO and the pulse DutyV2 illustrated in FIG. 3. That is, the waveform C and the waveform A in the triangular wave oscillator circuit 51 may be respectively used as the pulse DutyV1 and the pulse Duty V2. Note that the PWM2 pulse and others are not illustrated in FIG. 6; however, they are identical to those illustrated in FIG. 3. That is, the comparator OOMPH and the inverter INV1 that constitute part of a switching timing generator unit constitute a typical example of a first pulse signal generator unit in the second embodiment of the invention. The comparator COMPL and the inverter INV2 that constitute part of a switching timing generator unit constitute a typical example of a second pulse signal generator unit in the second embodiment of the invention.

Accordingly, the second embodiment may exhibit similar advantages as those of the first embodiment; however, the second embodiment may further exhibit the following advantages. Specifically, in the motor driver control device 50 according to the second embodiment, the triangular wave oscillator circuit 51 generates the pulse DutyV1 and the pulse DutyV2 based on the two pulses A and B obtained while generating the triangular wave TRO without having the first and second pulse signal generator circuits 12 and 13 that are provided in the motor driver control device 10 according to the first embodiment. That is, the pulse DutyV1 and the pulse DutyV2 can be generated by simply adding the inverter INV1 in the triangular wave oscillator circuit 51, and thus, the circuit configuration of the motor driver control device 50 according to the second embodiment can be made simple and compact.

Note that the DC voltage V3 and the DC voltage V4 are predetermined constant voltages and used in the generation of the triangular wave TRO. Therefore, it is undesirable to change values of the DC voltage V3 and the DC voltage V4. That is, in the motor driver control device 50 according to the second embodiment, respective duties of the pulse DutyV1 and the pulse DutyV2 are constant, and may not optionally be changed, as illustrated in the case of the motor driver control device 10 according to the first embodiment where the duties of the pulse DutyV1 and the pulse DutyV2 can optionally be changed by altering the first and second DC voltages V1 and V2.

Third Embodiment

A third embodiment describes an image forming apparatus having a motor control device.

Image Forming Apparatus Configuration According to Third Embodiment

Figure 7:
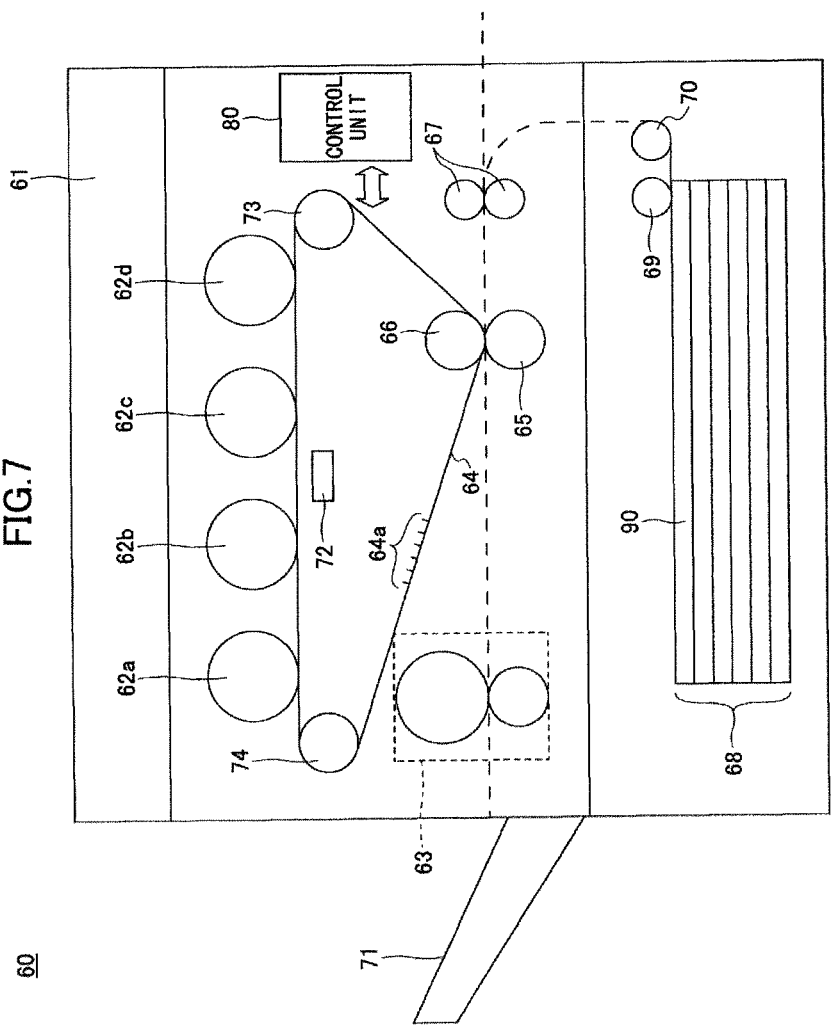
FIG. 7 is a schematic diagram illustrating a configuration example of a motor driver control device according to a third embodiment.
Figure 8:
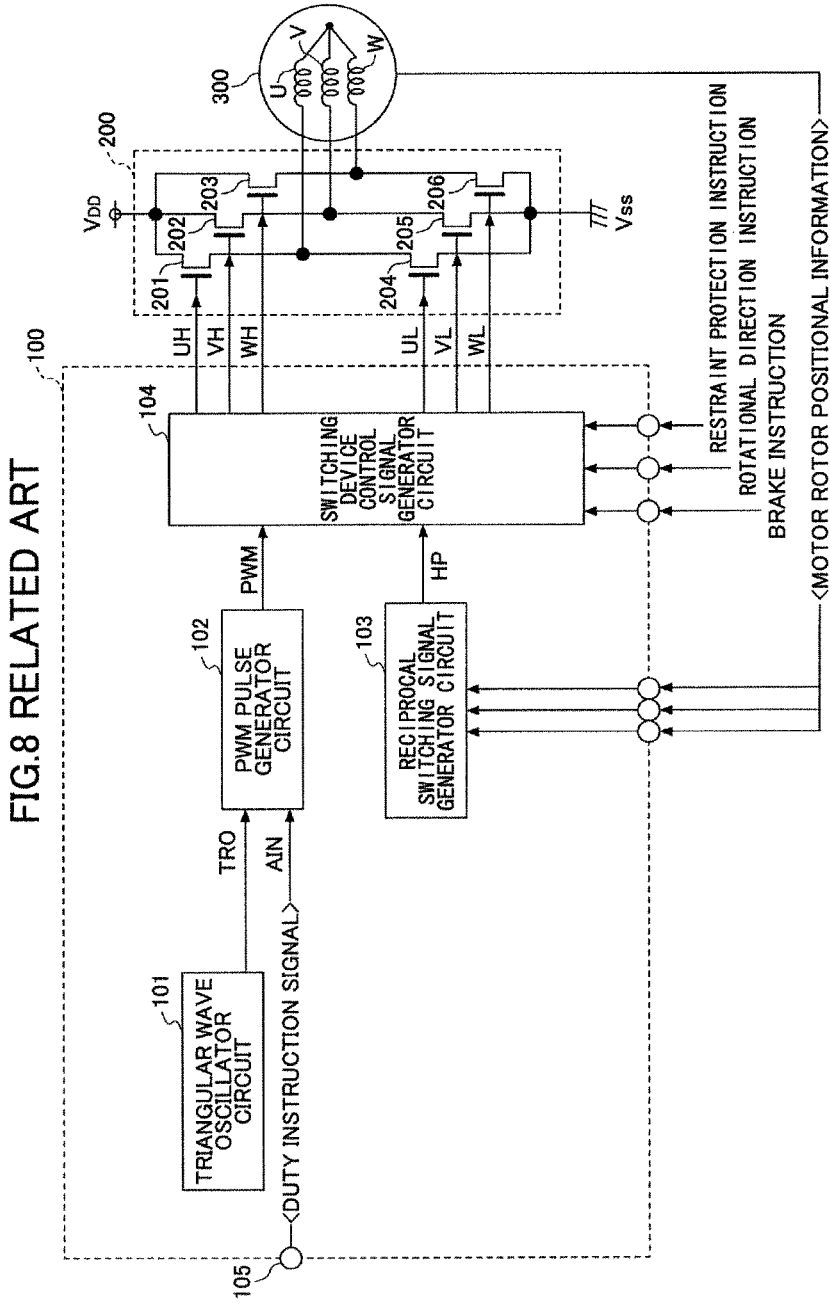
FIG. 8 is a schematic diagram illustrating a configuration example of a motor driver control device according to a related art.
Figure 9:
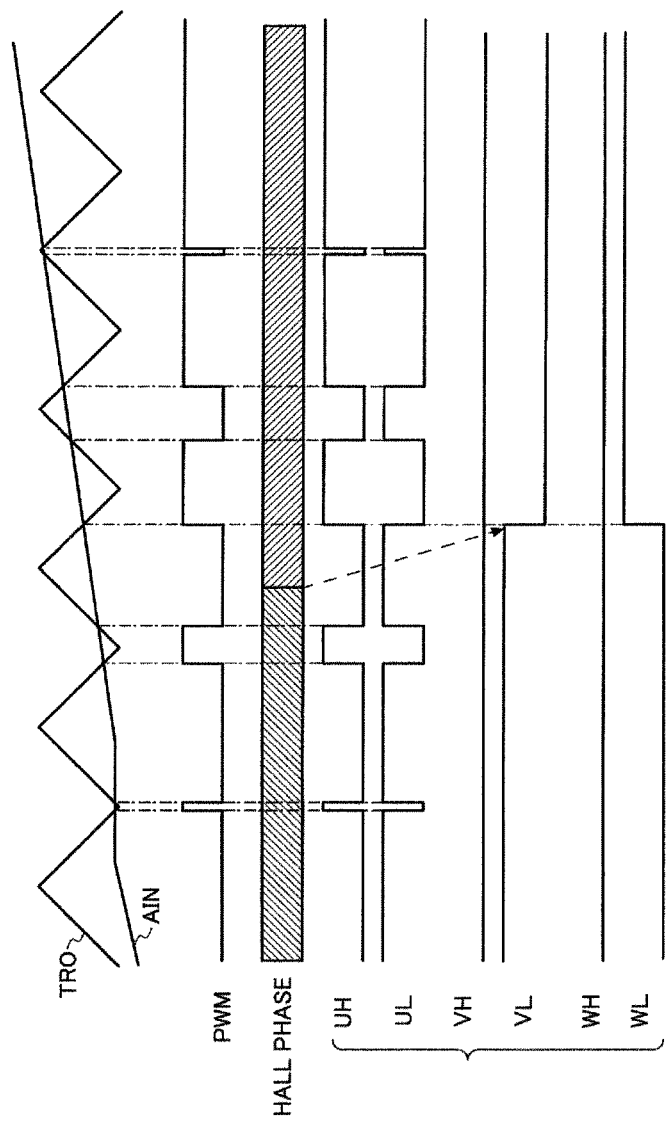
FIG. 9 is a diagram illustrating operations of the motor driver control device according to the related art in FIG. 8.

First, a schematic configuration of an image forming apparatus according to a third embodiment is described. FIG. 7 is a schematic diagram illustrating a configuration example of the image forming apparatus according to the third embodiment. An image forming apparatus 60 illustrated in FIG. 7 is a color image forming apparatus having an intermediate transfer belt of an endless transfer member. The image forming apparatus 60 includes a scanner unit 61, photosensitive drums 62*a*, 62*b*, 62*c*, and 62*d*, a fixing unit 63, an intermediate transfer belt 64, a secondary transfer roller 65, a repulsive roller 66, resist rollers 67, a paper-feed unit 68, a paper-feed roller 69, a paper-transfer roller 70, a paper-receiving unit 71, an intermediate transfer scale detection sensor 72, and a driving roller 73, a driven roller 74, and a control unit 80. A reference numeral 90 indicates transfer sheets.

The scanner unit 61 is configured to read a document. The photosensitive drums 62*a*, 62*b*, 62*c*, and 62*d* are configured to form, upon irradiation of laser beams, an image in corresponding colors of yellow (Y), cyan (C), magenta (M), and black (K). The fixing unit 63 is configured to fix a transferred toner image onto the transfer sheet 90.

The driving roller 73 is rotationally driven by an intermediate transfer belt motor (not shown), and the intermediate transfer belt 64 is transferred according to the rotation of the driving roller 73. The driven roller 74 is driven by the driving roller 73. The intermediate transfer belt 64 is configured to superimpose the image in the corresponding colors formed by the photosensitive drums 62*a*, 62*b*, 62*c*, and 62*d*. The secondary transfer roller 65 is configured to transfer the image formed on the intermediate transfer belt 64 onto the transfer sheet 90.

The repulsive roller 66 is arranged to face the secondary transfer roller 65 such that a nip portion is formed between the intermediate transfer belt 64 and secondary transfer roller 65. The resist rollers 67 are configured to transfer the transfer sheet 90 and correct the skewed transfer sheet 90 when it is skewed (skew correction). The paper-feed unit 68 is configured to contain the cumulated transfer sheets 90. The paper-feed roller 69 is configured to carry the transfer sheet 90 from the paper-feed unit 68 to the paper-transfer roller 70. The paper-transfer roller 70 is configured to transfer the transfer sheet 90 carried from the paper-feed roller 69 to the resist rollers 67. The paper-receiving unit 71 is configured to receive the transfer sheet 90 on which the image is transferred and fixed.

The intermediate transfer scale 64*a* is formed on the intermediate transfer belt 64. The intermediate transfer scale 64*a* is a scale composed of reflective parts and non-reflective parts alternately arranged at constant intervals along a transfer direction. The intermediate transfer scale detection sensor 72 is arranged at a position near the intermediate transfer belt 64 so as to read the intermediate transfer scale 64*a*. The intermediate transfer scale detection sensor 72 is configured to generate a pulse signal at a timing corresponding to the constant intervals of the intermediate transfer scale 64*a* formed on the intermediate transfer belt 64.

The control unit 80 is configured to control various functions and operations of the image forming apparatus 60. The control unit 80 may include a CPU, a ROM, and a main memory, and the various functions may be implemented by loading computer programs recorded on the ROM in the main memory to be executed by the CPU. Note that all or part of the functions of the control unit 80 may be implemented by hardware only. Alternatively, all or part of the functions of the control unit 80 may be physically implemented by plural apparatuses. So far, the description is given of the schematic configuration of the image forming apparatus according to the third embodiment.

Image Forming Apparatus Operation According to Third Embodiment

Next, a schematic operation of the image forming apparatus according to the third embodiment is described. In the image forming apparatus 60, an image scanned by the scanner unit 61 is transferred to the control unit 80, which generates data of the scanned image (hereinafter called "image data") formed on the transfer sheet 90. The generated image data are formed on the photosensitive drums 62*a* to 62*d*, which are subsequently formed on the intermediate transfer belt 64. Further, the image formed on the intermediate transfer belt 64 is transferred on the transfer sheet 90 at a timing when the transfer sheet 90 is transferred from the paper-feed unit 68 to a gap between the intermediate transfer belt 64 and the secondary transfer roller 65.

In this process, a photosensitive motor (not shown) configured to drive the photosensitive drums 62*a* to 62*d*, a intermediate transfer motor (not shown) configured to drive the intermediate transfer belt 64, and a secondary transfer motor (not shown) configured to drive the secondary transfer roller 65 are controlled at a respective predetermined speed by the control unit 80 such that the image is correctly formed on the transfer sheet 90.

An example of the intermediate transfer motor (not shown) includes a three-phase brushless motor such as the brushless motor 30 according to the first and second embodiments. The control unit 80 includes a motor control device composed of, for example, the motor driver control device 10 and the PWM inverter 20 according to the embodiments, so that the control unit 80 controls the intermediate transfer motor (not shown) of the three-phase brushless motor as illustrated in the first embodiment.

The image formed on the transfer sheet 90 passes through the fixing unit 63. In this process, the fixing unit 63 fixes a toner image transferred on the transfer sheet 90. The transfer sheet 90 on which the toner image is fixed is then discharged to the paper-receiving unit 71. So far, the description is given of the schematic operation of the image forming apparatus according to the third embodiment.

As described above, the image forming apparatus having the motor control device can be implemented by the third embodiment.

The preferred embodiments and examples are described heretofore. However, the present invention is not limited to these embodiments and examples, and various modifications and substitutions may be made to the above embodiments and examples without departing from the scope of the present invention.

For example, the image forming apparatus according to the third embodiment may include a motor control device composed of the motor driver control device 50 and the PWM inverter 20 in place of the motor control device composed of the motor driver control device 10 and the PWM inverter 20.

Accordingly, the embodiments of the present invention may provide the motor driver control method and the motor driver control device capable of supplying stable clocks to the logic circuit, the motor control device having the motor driver control device, and the image forming apparatus having the motor control device.

The descriptions of exemplary embodiments for implementing the invention have been provided heretofore. The present invention is not limited to these embodiments, but various variations and modifications may be made without departing from the scope of the present invention.

The present application is based on Japanese priority application No. 2009-138520 filed on Jun. 9, 2009, with the Japanese Patent Office, the entire contents of which are hereby incorporated by reference.

What is claimed is:

1. A motor driver control device controlling a plurality of switching devices that drive a motor, the motor driver control device comprising:
    a duty control unit configured to receive a first pulse signal having a first predetermined duty and a second pulse signal having a second predetermined duty and to restrict a duty of a first pulse width modulation signal so as to generate a second pulse width modulation signal having a duty between the first predetermined duty of the first pulse signal and the second predetermined duty of the second pulse signal; and
    a switching device control signal generator unit configured to include a logic circuit that operates the second pulse width modulation signal as a clock, and configured to generate a plurality of switching device control signals to control the plurality of respective switching devices, based on the second pulse width modulation signal having the duty between the first predetermined duty of the first pulse signal and the second predetermined duty of the second pulse signal, to select a phase of the motor,
    wherein the switching device control signals change state upon a next change of the second pulse width modulation signal from one of low state and high state to the other of said low state and high state.

2. The motor driver control device as claimed in claim 1, wherein the duty control unit includes:
    a first pulse signal generator unit configured to generate the first pulse signal having the first duty;
    a second pulse signal generator unit configured to generate the second pulse signal having the second duty which is smaller than the first duty; and
    a selector unit configured to selectively output the second pulse width modulation signal having the duty between the first duty and the second duty based on the first pulse signal and the second pulse signal.

3. The motor driver control device as claimed in claim 2,
    wherein the first pulse width modulation signal is generated by comparing (i) an oscillator signal generated by an oscillator at a predetermined cycle and (ii) a pulse generator signal,
    wherein the first pulse signal generator unit is configured to generate the first pulse signal having the first duty by comparing the oscillator signal generated at the predetermined cycle and a first direct-current voltage, and
    wherein the second pulse signal generator unit is configured to generate the second pulse signal having the second duty by comparing the oscillator signal generated at the predetermined cycle and a second direct-current voltage that is smaller than the first direct-current voltage.

4. The motor driver control device as claimed in claim 2, further comprising:
    an oscillator signal generator unit configured to generate an oscillator signal generated at a predetermined cycle,
    wherein the oscillator signal generator unit is configured to include the first pulse signal generator unit and the second pulse signal generator unit.

5. The motor driver control device as claimed in claim 4,
    wherein the oscillator signal generator unit further includes a storage unit, a charging unit configured to charge the storage unit, a discharging unit configured to discharge the storage unit, a switching unit configured to switch the charging unit and the discharging unit, and a switching timing signal generator unit configured to generate a switching timing signal supplied to the switching unit, and
    wherein the first pulse signal generator unit and the second pulse signal generator unit are configured to include at least one component of the switching timing signal generator unit.

6. A motor control device comprising;
    the plurality of switching devices; and
    the motor driver control device as claimed in claim 1 to control the plurality of switching devices.

7. An image forming apparatus comprising:
    one or more operation units to form an image on an image forming medium;
    a motor; and
    the motor control device as claimed in claim 6 to control the motor to drive the one or more operation units.

8. A motor driver control method for controlling a plurality of switching devices that drive a motor, comprising:
    receiving a first pulse signal having a first predetermined duty and a second pulse signal having a second predetermined duty and restricting a duty of a first pulse width modulation signal so as to generate a second pulse width modulation signal having a duty between the first predetermined duty of the first pulse signal and the second predetermined duty of the second pulse signal; and
    generating a plurality of switching device control signals to control the plurality of respective switching devices, based on the second pulse width modulation signal having the duty between the first predetermined duty of the first pulse signal and the second predetermined duty of the second pulse signal, to select a phase of the motor,
    wherein the switching device control signal changes state upon a next change of the second pulse width modulation signal from one of low state and high state to the other of said low state and high state.

9. The motor driver control method as claimed in claim 8, further comprising:
selectively outputting the second pulse width modulation signal having the duty between the first duty and the second duty based on the first pulse signal and the second pulse signal.

10. The motor driver control method as claimed in claim 9, further comprising:
generating the first pulse signal having the first duty by comparing an oscillator signal generated at a predetermined cycle and a first direct-current voltage, and
generating the second pulse signal having the second duty by comparing the oscillator signal generated at the predetermined cycle and a second direct-current voltage that is smaller than the first direct-current voltage.

* * * * *